United States Patent [19]

Atkinson et al.

[11] Patent Number: 4,492,776

[45] Date of Patent: Jan. 8, 1985

[54] HYDROGEL CONTACT LENSES FOR PERMANENT WEAR

[75] Inventors: Ivor B. Atkinson; Barry C. Holdstock, both of Surbiton, England

[73] Assignee: CooperVision, Inc., Menlo Park, Calif.

[21] Appl. No.: 599,739

[22] Filed: Apr. 12, 1984

Related U.S. Application Data

[62] Division of Ser. No. 505,419, Jun. 16, 1983, Pat. No. 4,451,630.

[30] Foreign Application Priority Data

Apr. 29, 1983 [GB] United Kingdom ............... 8311788

[51] Int. Cl.³ .................................. C08J 3/00
[52] U.S. Cl. ................................ 523/108; 524/808; 526/261; 351/160 H
[58] Field of Search ................ 523/108; 524/808; 526/261

[56] References Cited

U.S. PATENT DOCUMENTS 3,220,960  11/1965  Wichterle ........................ 521/149

FOREIGN PATENT DOCUMENTS 1385677  2/1975  United Kingdom .
1475605  6/1977  United Kingdom .
1575694  9/1980  United Kingdom .

Primary Examiner—Joseph L. Schofer
Assistant Examiner—J. M. Reddick
Attorney, Agent, or Firm—Vorys, Sater, Seymour and Pease

[57] ABSTRACT

A process is disclosed for the preparation of hydrogel contact lenses having improved mechanical properties, said process comprising polymerizing, in the presence of an azo type initiator, a monomer mixture comprising from 25% to 50% by weight of N-vinyl pyrrolidone, up to 5% by weight of methacrylic or acrylic acid, 0.1 to 1% by weight of 1,3,5-tris(propenoxy)-2,4,6-triazine (TPT), or perhydro-2,4,6,-triketo-1,3,5,-tris (propene-2)-1,3,5-triazine (T.T.P.T.), as a cross-linking monomer, the balance being essentially hydroxy alkyl acrylate or methacrylate, wherein the alkyl group is ethyl or propyl.

1 Claim, No Drawings

HYDROGEL CONTACT LENSES FOR PERMANENT WEAR

This is a division of application Ser. No. 505,419 filed June 16, 1983 U.S. Pat. No. 4,451,630.

TECHNICAL FIELD

This invention relates to contact lenses of the kind which are polymer hydrogels containing a major proportion of water.

BACKGROUND AND SUMMARY OF THE INVENTION

Polymer hydrogels are widely used for contact lenses and a large number of soft contact lenses of this type are based on the polymers described in U.S. Pat. No. 3,220,960 (Wichterle). Wichterle's polymers are hydroxy (lower alkyl) methacrylates or acrylates, cross-linked with a small percentage of the corresponding diester e.g. ethylene glycol dimethacrylate (EGDM). Polymers based upon hydroxy ethyl methacrylate (HEMA) and cross-linked with EGDM can be hydrated to form clear hydrogels having good mechanical properties. Unfortunately the oxygen permeability of such lenses (which is directly related to the retained water content) is generally insufficient to allow the lenses to be worn continuously. Consequently, although soft lenses are usually more comfortable than hard lenses, most commercial soft lenses have to be removed at night in order to avoid the development of anoxic edema arising from insufficient corneal respiration.

One important exception is the soft lens marketed under the Registered Trade Mark "Permalens" by Coopervision (U.K.) Limited and described in British Pat. Nos. 1,475,605 and 1,385,677. While such soft contact lenses have been commercially successful there has been a continuing need to further improve the mechanical properties of the hydrogels, especially in relation to resistance to tear initiation and "toughness". In this specification the "toughness" of a hydrogel means the area between the stress-strain curve of the hydrogel and the strain axis. Tear initiation strength and toughness have been found from experience to be predictors of durability of a hydrogel considered for use as a contact lens material.

It has now surprisingly been found that substantial improvements in the mechanical properties of lenses of the kind generally described in the above patents can be secured by selection of a narrow range of monomer compositions and by effecting the polymerisation under particular conditions.

According to one aspect of the present invention there is provided a process for the preparation of a contact lens comprising a hydrogel having a water content from about 50% to 85% by weight of water, which process comprises polymerizing, in the presence of an azo type initiator, a monomer mixture comprising from 25 to 50% by weight of N-vinyl pyrrolidone, up to 5% by weight of methacrylic or acrylic acid, and 0.1 to 1% by weight of 1,3,5-tris(propenoxy)-2,4,6-triazine (TPT) or perhydro-2,4,6,-tris (propene-2)-1,3,5,-triazine (T.T.P.T.), as a cross-linking monomer, the balance being essentially hydroxy alkyl acrylate or methacrylate, wherein the alkyl group is ethyl or propyl.

DETAILED DESCRIPTION OF THE INVENTION

Generally the polymerisation mixture contains less than 0.1% by weight of cross-linking monomer other than 1,3,5-tris(propenoxy)-2,4,6-triazine (TPT). Commercially available hydroxy ethyl methacrylate (HEMA) may contain substantially more than this level of diester cross-linking agent. By distillation of the HEMA monomer, the level of diester cross-linking agent can readily be reduced to about 0.1 to 0.12% by weight of the HEMA and when mixed with the N-vinyl pyrrolidone (NVP) the diester monomer level is reduced to less than about 0.1% overall. Optimum mechanical properties in the final polymer are obtained when the cross-linking monomer is essentially all TPT or TTPT, an impurity level of up to 0.1% of dimethacrylate or diacrylate (preferably less than 0.07%) being tolerable.

The polymerisation initiator employed is an azo type initiator such as azo isobutyronitrile (AIBN). Use of organic peroxy type initiators results in inferior mechanical properties.

Polymerisation may be carried out under anaerobic conditions, e.g. in a nitrogen atmosphere or in a water bath. In the case where cast lenses are desired, the polymer compositions may be metered into polypropylene moulds and held in a nitrogen-purged oven to allow polymerisation to take place. The casting process employed may be that described in British Pat. No. 1,575,694 (Shepherd). Alternatively, the polymerisation mixture may be filled into PTFE moulds, sealed and placed in a water bath to form polymerised lens blanks or buttons which can then be machined to produce, after swelling in aqueous medium, the final soft contact lens.

In both cases, the polymerisation is preferably carried out in two or more stages, in which the temperature is gradually raised or raised in step-wise manner from an initial temperature of about 40° to 60° C. to a final cure temperature of about 100° C.

As disclosed in British Pat. No. 1,475,605 hydrophilic polymers containing copolymerised unsaturated acid, e.g. methacrylic or acrylic acid, retain a larger proportion of water in their swollen condition by treatment with an aqueous alkaline solution. This has the effect of converting the acid groups to carboxylate salt groups, which apparently impart a greater water-holding capacity to the hydrogel.

Preferably the NVP is employed in an amount of from 30 to 50% by weight and the TPT in an amount of from 0.1 to 0.5%.

The polymers prepared accoring to the present invention are similarly treated with aqueous alkaline solution when forming the hydrogel or subsequently to its formation. The conditions described in the above mentioned British patent may be employed, preferably treatment at a pH of about 7.4 to 8 with a dilute aqueous solution containing sodium or potassium ions.

The invention accordingly includes a contact lens comprising a polymer hydrogel having a water content of from about 50 to 85% by weight of water, preferably 55 to 80%, and containing alkali metal or alkaline earth metal carboxylate moieties, wherein said polymer is the product obtained by polymerising in the presence of an azo type initiator from 25 to 50% by weight of N-vinyl pyrrolidone, up to 5% by weight of acrylic or methacrylic acid, 0.1 to 1% by weight of 1,3,5-tris(propenoxy)-2,4,6-triazine (TPT) as cross-linking monomer, the balance being essentially hydroxy ethyl methacrylate.

The following Examples are given to illustrate the present invention:

EXAMPLE 1

Purified HEMA containing about 0.08% of ethylene glycol dimethacrylate (EGDM) and about 0.2% of methacrylic acid was mixed with NVP, 1,3,5-tris(-propenoxy)-2,4,6-triazine (TPT) and additional methacrylic acid (MA) to produce a monomer mixture having the following analysis:

| Monomer | % by weight |
|---|---|
| EGDM | 0.06 |
| MA | 1.76 |
| NVP | 39.32 |
| HEMA | 58.61 |
| TPT | 0.25 |

AIBN was added to the monomer mixture as the sole polymerisation initiator in an amount of 0.2 gram per 100 grams of mixture.

The mixture as filtered and freed from oxygen by bubbling nitrogen through the mixture for 5 minutes. Contact lenses were made from the mixture by two methods as follows:

(A) In the first method the mixture was filled into PTFE button-shaped moulds and polymerised by heating at 55° C. for 20 hours in a water bath and then heated at 120° C. for 3 hours. Contact lenses were machined from the resulting hard buttons using a contact lens lathe. After extraction of unreacted monomer and other residual materials using water in a Soxhlet apparatus, the lenses were equilibrated in an aqueous solution buffered at a pH of 7.5. The water content and linear swell factor of the resulting lenses are given in Table 1 below and the mechanical properties in Table 2 under 1A.

(B) In the second manufacturing method, lenses were directly cast in polypropylene moulds using the procedure described in British Pat. No. 1,575,694. The filled moulds were placed in a nitrogen purged oven at ambient temperature, raised to 55° C. and held at that temperature for 20 hours. Thereafter the temperature was raised to 120° C. for 3 hours, after which the moulds were cooled and opened. Extraction of residual materials and equilibrating in mildly alkaline aqueous solution was carried out as described above. The properties of the lenses are tabulated below under 1B.

In Table 2 below the mechanical properties of lenses 1A and 1B are compared with the properties of lenses prepared in the manner described in British Pat. No. 1,475,605 using substantially the same proportion of HEMA, NVP and MA but employing 0.36% of EGDM as the cross-linking monomer and 2.5 mls per 100 mls of monomer mixture of Cyclonox LE-50 initiator (cyclohexanone peroxide). The mechanical properties of lenses cast from this polymerisation mixture are given under 1C in Table 2.

TABLE 1

| | 1A | 1B |
|---|---|---|
| Water content at 25° C. (% w/w) | 72 | 72 |
| Linear swell factor at 21° C. (%) | 1.55 | 1.53 |
| Refractive index at 21° C., hydrated | 1.376 | 1.376 |
| Refractive index at 21° C., dry | 1.515 | 1.515 |

TABLE 2

| | 1C | 1A | 1B |
|---|---|---|---|
| Tensile strength (kg f cm$^{-2}$) | 0.80 | 1.47 | 1.48 |
| Elongation at break (%) | 98 | 217 | 265 |
| Toughness (mJcm$^{-3}$) | 38 | 173 | 201 |
| Tear initiation strength (kg f cm$^{-1}$) | 0.060 | 0.150 | 0.136 |
| Tear propogation strength (kg f cm$^{-1}$) | 0.015 | * | 0.028 |
| Young's modulus (kg f cm$^{-2}$) 50% strain | 0.94 | 0.93 | 0.79 |

* could not be determined - tear did not propogate in a uniform manner.

As can be seen from Table 2, the mechanical properties of the lenses produced in accordance with the invention are all significantly improved compared with those of one of the better products mechanically which can be made according to the teaching of British Pat. No. 1475605. In particular it should be noted that the tensile strength is almost doubled, the elongation at break is increased by a factor of 2 to 2½, while the toughness is improved by a factor of about 5 and the tear initiation strength is more than doubled. Furthermore these improvements are not attained at the expense of other important characteristics of the lenses. In fact clinical tests carried out so far have shown that wearing comfort and optical properties have been, at least equal to those of standard 'Permalens'.

EXAMPLE 2

The procedure described in Example 1 was repeated using a monomer mixture having the following analysis:

| Monomer | % by weight |
|---|---|
| NVP | 30 |
| HEMA | 69.22 |
| MA | 0.42 |
| TPT | 0.28 |
| EGDM | 0.08 |

AIBN was added to the monomer mixture as the sole polymerisation initiator in an amount of 0.2 gram per 100 grams of monomer mixture.

The mixture was cast in moulds and polymerised according to manufacturing method B. described in Example 1.

After swelling in mildly alkaline aqueous saline solution the resulting hydrogel lenses were found to have the properties indicated in Table 3 below:

TABLE 3

| Equilibrium water content (% w/w) | Tensile strength Kgf cm$^{-2}$ | Elongation at break % | Young's modulus at 50% strain (Kgf cm$^{-2}$) | Toughness (mJcm$^{-3}$) | Tear strength (Kgf cm$^{-1}$) Initiation | Tear strength (Kgf cm$^{-1}$) Propagation |
| --- | --- | --- | --- | --- | --- | --- |
| 57 | 2.75 | 324 | 1.25 | 512 | 0.296 | 0.095 |

It will be seen from the properties shown in Table 3 that the toughness and tear initiation strength are further improved compared with the equivalent properties of the lenses produced in Example 1, although the water content is reduced.

When comparing the improved lenses in accordance with the invention with the standard 'Permalens' product, it is noteworthy that the improved lenses appear more elastic or rubbery in nature in that they snap back more readily when stretched.

The reason for the desirable properties of the lenses of this invention is not fully understood.

However, a larger proportion of the monomers present in the polymerisation mixture is apparently converted into segments which are incorporated in the resulting polymer. This is evident from the much lower proportions of unreacted monomer (especially NVP) which is leached out in the Soxhlet treatment step.

Furthermore, experiments have shown that the desirable properties of the lenses of the invention arise from a combination of a number of factors, principally the use of an azo initiator in conjunction with a tripropenoxy-triazine cross-linking monomer.

We claim:

1. A contact lens comprising a polymer hydrogel having a water content of from about 55 to 85% by weight of water and containing alkali metal or alkaline earth metal carboxylate moieties, wherein said polymer is the product obtained by polymerizing, in the presence of an azo type initiator, from 30 to 50% by weight of N-vinyl pyrrolidone, up to 5% by weight of acrylic or methacrylic acid, 0.1 to 1% by weight of 1,3,5-tris(-propenoxy)-2,4,6-triazine as cross-linking monomer, the balance being essentially hydroxyethyl methacrylate and subsequently swelling in aqueous medium.

* * * * *